May 19, 1953 H. WARD 2,638,983
APPARATUS FOR THE MANUFACTURE OF INLAID FLEXIBLE
SMOOTH SURFACE COVERINGS AND THE LIKE
Filed April 8, 1950 6 Sheets-Sheet 5

INVENTOR.
HUGH WARD
BY
Kenyon & Kenyon
ATTORNEYS

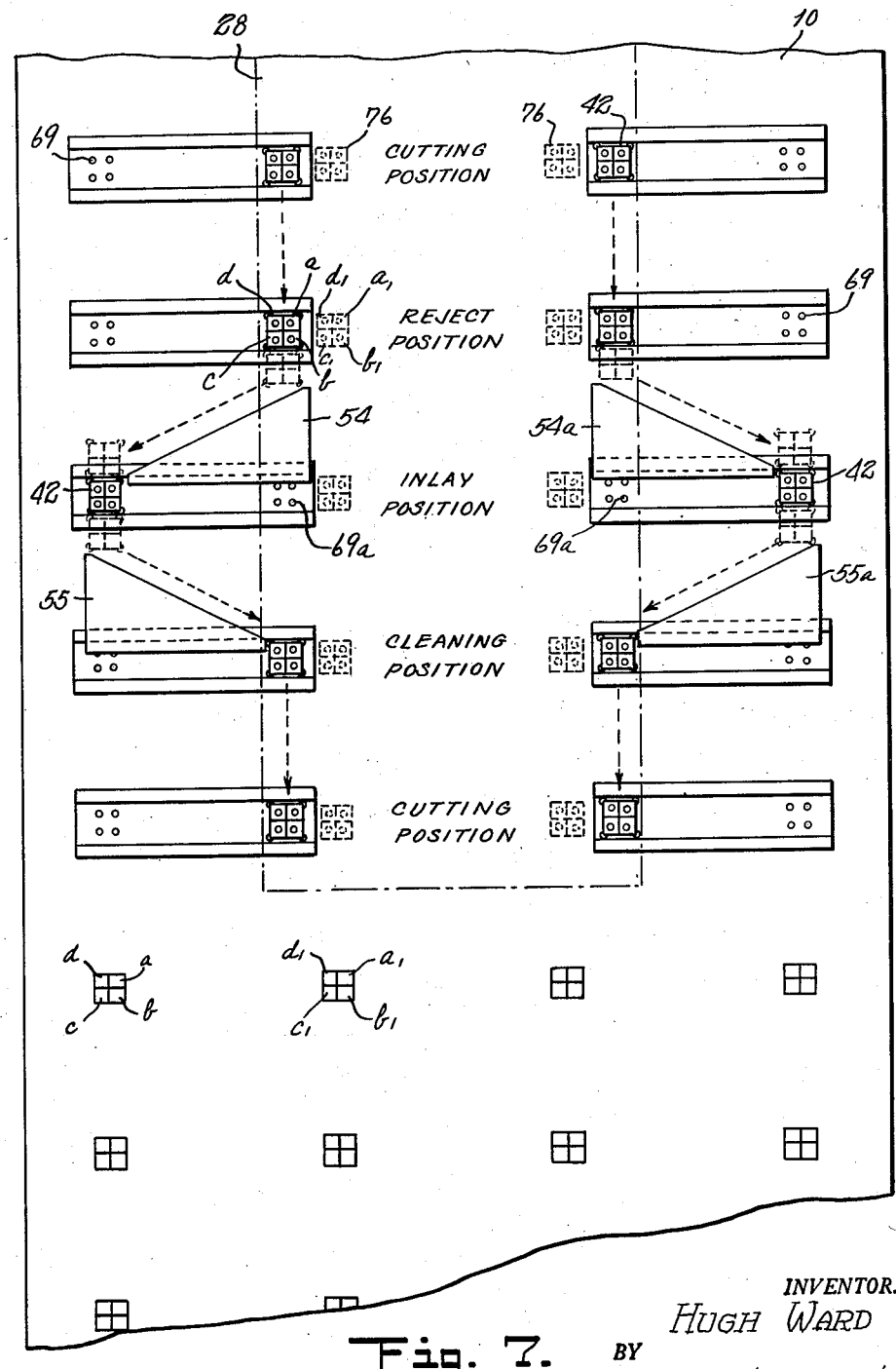

Patented May 19, 1953

2,638,983

UNITED STATES PATENT OFFICE 2,638,983

APPARATUS FOR THE MANUFACTURE OF INLAID FLEXIBLE SMOOTH SURFACE COVERINGS AND THE LIKE

Hugh Ward, Kearny, N. J., assignor to Congoleum-Nairn Inc., a corporation of New York Application April 8, 1950, Serial No. 154,786

9 Claims. (Cl. 164—28)

This invention relates to apparatus for the manufacture of flexible smooth surface coverings and relates particularly to apparatus for the continuous manufacture of such coverings so as to comprise pattern units or tesserae of composition material which are secured to a backing sheet in predetermined inlaid locations so as to produce a desired pattern. Apparatus for the continuous production of inlaid linoleum covering materials and the like is typical of the apparatus to which this invention relates.

In apparatus for the continuous production of an inlaid flexible smooth surface covering, e. g., linoleum, the base sheet of the covering is continuously fed into the apparatus and two or more sheets of calendered linoleum composition are likewise fed into the apparatus, the number of such calendered sheets depending on the number of different colors for the pattern units contained in the finished covering. Each of the sheets of calendered linoleum composition is fed to a cutting cylinder which presents cutting dies for cutting the desired tesserae from the calendered sheet material during the rotation of the cutting cylinder. The unwanted material is rejected from the cutting cylinder during its rotational movement and the desired tesserae are carried to the rotational position of the cutting cylinder whereat they are transferred to the backing sheet as the backing sheet moves through the machine. The cutting dies for cutting the tesserae from each of the sheets of linoleum composition are so arranged as to deposit the tesserae on the backing sheet in inlaid contiguous arrangement with tesserae cut from the other sheets of linoleum composition so as to afford complete coverage for the backing sheet with the tesserae arranged in the desired predetermined pattern.

Many of the currently popular patterns for coverings of the kind in question comprise a background in which tesserae of one or more contrasting colors are geometrically arranged to provide an attractive pattern. In such case the background may constitute from 80% to 90% of the pattern as a whole. The cutting cylinder which carries the sheet of linoleum composition for the background, therefore, rejects only a small percentage of scrap. However, the cutting cylinders which carry the other sheet or sheets from which tesserae are cut reject a very high percentage of scrap. For example, if the background comprises as aforesaid about 80% to 90% of the pattern and if the finished pattern is to contain tesserae of three different contrasting colors, the tesserae of each different contrasting color being cut from a different sheet, the cutting cylinders which carry the sheets of contrasting color will necessarily reject a very high percentage, e. g., 90% or more, of the calendered linoleum composition fed into the machine. In general commercial practice the width of the material passing through the machine is slightly over 72″. Because the pattern produced is generally an overall pattern extending across the entire width of the finished sheet it has heretofore been the practice to feed all of the calendered sheets into the machine in the full width of the finished material; and when it is considered that only a very small percentage of the sheet or sheets other than the background sheet is retained, it is apparent that the amount of rejected scrap produced is very large. This disadvantage, while a serious one, has previously been regarded as an unavoidable incident to the use of apparatus for the continuous production of coverings of the inlaid linoleum type.

It is one of the principal objects of this invention to afford improved apparatus of the character referred to whereby the amount of scrap material produced can be greatly reduced. It is a further object of this invention to provide cutting cylinder construction which is substantially less costly to manufacture and to maintain because of the lesser number of parts required.

It is one of the features of this invention that a cutting cylinder construction is afforded whereby tesserae cut from a sheet of calendered linoleum composition may be moved lengthwise of the cylinder during the rotation of the cylinder. Thus means is afforded whereby a cutting die carried by the cutting cylinder is slidably mounted lengthwise thereof so that it may be in one location for cutting one or more tesserae from the calendered sheet material and in another location relative to the length of the cylinder at which one or more tesserae carried thereby may be transferred to the backing sheet in desired location in reference to the overall pattern to be produced. If the location of the movable cutting die when in cutting position is spaced substantially inwardly from the end of the cutting cylinder and if means is afforded for moving the movable cutting die to a predetermined location adjacent the end of the cylinder at which one or more tesserae carried thereby are transferred to the backing sheet, it is apparent that the sheet of calendered linoleum composition need not be the full width of the base sheet fed through the machine and that it is possible according to this invention to apply tesserae to the backing sheet substantially over the entire width thereof even though the sheet of calendered linoleum composition is only from about 22″ to about 28″ in width while the backing sheet is of the width indicated above, namely, slightly over 72″. In this way great savings in the amount of scrap produced can be realized. Moreover, since the cutting cylinder with which the movable die construction is utilized is required to carry a sheet that is only of the order of 22″ to 28″ in width, it is apparent that the width of the peripheral surface of the cutting cylinder which is necessary for carrying the sheet may be correspondingly reduced with resultant avoidance of the necessity for building up the surface of the cutting cylinder to the full width of the base sheet, as has been the previous practice. The surface construction of the cutting cylinders comprises a large number of parts and by thus reducing the width of the portion required to handle the calendered sheet material the number of parts required in the construction of the cutting cylinder can be greatly reduced, thus reducing the cost of the cylinder as well as maintenance costs.

Ordinarily the movable cutting die construction is used in conjunction with fixed cutting dies so that desired tesserae may be cut from the calendered sheet both by the movable cutting dies and by the fixed cutting dies while the movable cutting dies are in relatively close proximity lengthwise of the roll to the fixed cutting dies. During the rotation of the cutting roll so as to carry the dies from the rotational position where the tesserae are cut to the rotational position where they are transferred to the base sheet, the movable dies are moved lengthwise of the cylinder so as to increase by a predetermined amount the spacing between the fixed dies and the movable dies. In this manner a geometrical pattern can be produced over substantially the entire width of the finished product.

The operations above described can be repeated in cutting tesserae from other calendered sheets, also of reduced width, the number of such sheets required depending on the particular pattern to be produced.

Further objects, features and advantages of this invention will be apparent in connection with the following description of a typical preferred embodiment of this invention in connection with the accompanying drawings, wherein Fig. 1 is a schematic showing in side elevation of one type of machine for the continuous manufacture of inlaid linoleum coverings and the like with which this invention may be employed;

Fig. 7 is a planar development showing the positions of two of the movable cutting dies relative to the cutting cylinder, cams and fixed cutting dies during the rotation of the cutting cylinder, and Fig. 8 is a sectional detail view of a typical cutting die of known construction including means for ejecting tesserae therefrom which may be employed for the fixed cutting dies used in combination with the movable cutting dies.

Figure 1:
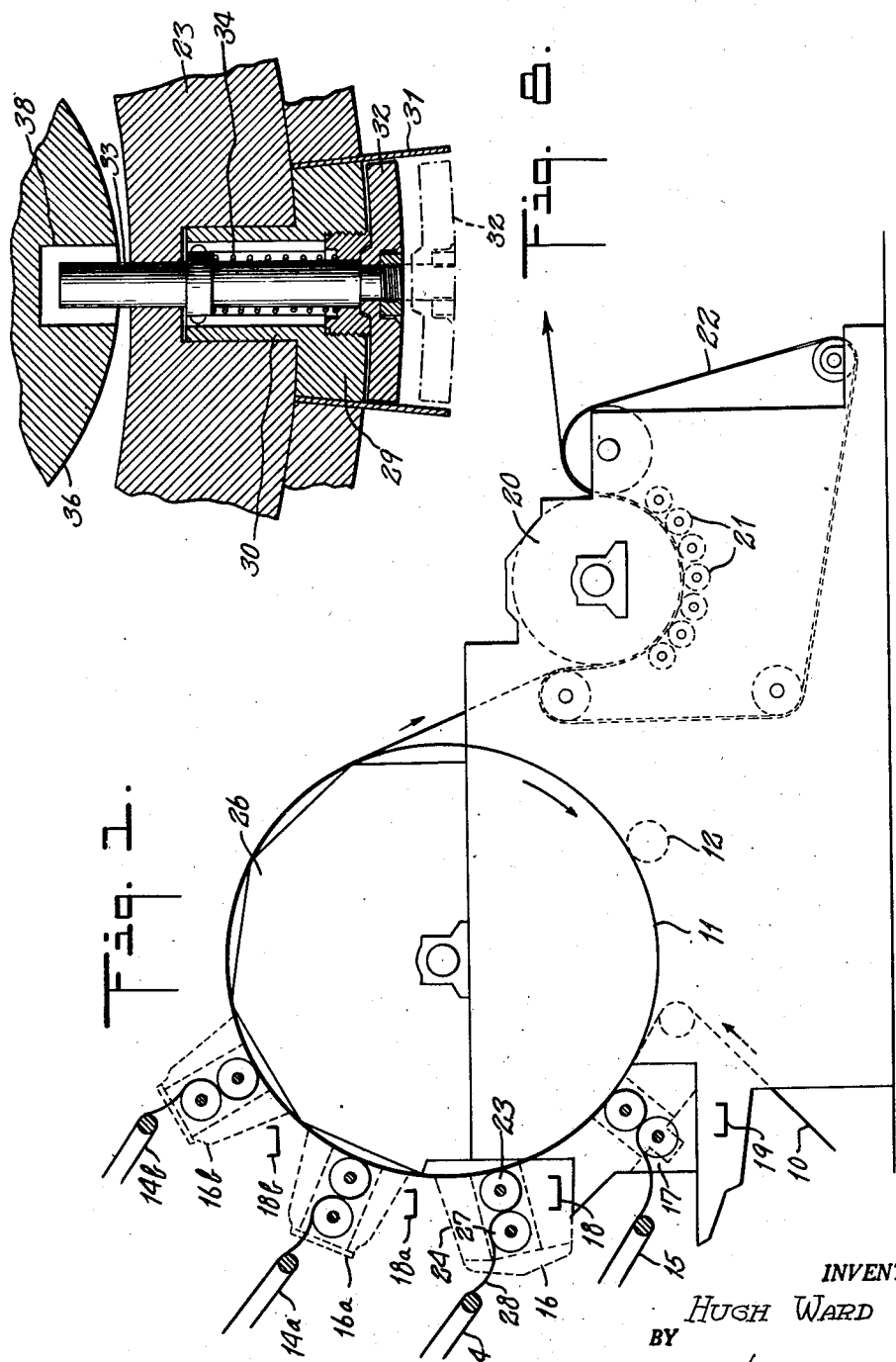

While this invention is applicable to any type of apparatus for the continuous production of inlaid linoleum coverings the nature of a typical apparatus of this type with which this invention may be employed has been shown schematically in Fig. 1. In the apparatus shown a sheet 10 of backing material is fed onto and is carried by the surface of a large inlaying drum 11 which is continuously rotated as by the driving gear 12. The linoleum composition which is to be deposited on the backing is formed into sheets by suitable calendering devices, not shown; and the calendered sheets are carried by means of belts to the respective cutting cylinder assemblies. As will be described more in detail hereinbelow, each of the cutting cylinder assemblies is adapted to cut the desired tesserae from the calendered sheet handled thereby and to transfer them to the backing sheet as the backing sheet is moved thereby, the unwanted material being rejected. In the particular embodiment shown the calendered sheet which is to constitute the background of the pattern is fed by the belt 15 to the cutting cylinder assembly 17, the unwanted material being collected in the collector 19 for removal from the machine. The cutting cylinder of the cutting cylinder assembly 16 is adapted to cut tesserae from a sheet of contrasting color fed to it by the belt 14 and to deposit them on the backing sheet 10 in inlaid relation to the background as the backing sheet passes the assembly 16. The unwanted material from the assembly 16 is removed from the machine by the collector 18. If any other additional colors are desired additional assemblies such as 16 are provided to which calendered sheets of other colors may be supplied for cutting tesserae therefrom and inlaying them on the backing sheet in the desired location. In the embodiment shown two such additional assemblies are shown, namely, 16a and 16b with their associated feeding belts 14a and 14b and collectors 18a and 18b, respectively.

After the tesserae constituting the complete pattern have been deposited on the backing sheet, the completed covering is transferred from the inlaying drum 11 to the smooth-surface finishing drum 20 which ordinarily is heated and against which the covering is pressed by the pressure applying rolls 21 acting through the travelling rubber blanket 22 so as to consolidate the deposited tesserae and afford a continuous smooth surface. Thereafter the covering may be passed on for further treatment or curing as may be desired.

The present invention is directed particularly to the provision of improved mechanisms associated with the cutting cylinder which cuts the desired tesserae from the calendered linoleum composition. The general construction and arrangement of each of the cutting roll assemblies in which the improvements may be embodied, may be conventional and for this reason the conventional elements of a typical cutting cylinder assembly have been shown only schematically in Figs. 1, 2 and 3. In the embodiment shown and referring, for purposes of illustration, to the cutting cylinder assembly 16, the cutting cylinder 23 is rotatably mounted in the frame members 24 which are carried by a suitable support 26 so that the periphery of the cutting cylinder will come into juxtaposition with the surface 25 of the inlaying drum 11. Also rotatably carried by the frame members 24 is the presser roll 27 which is mounted so as to be maintained in pressure contact with the periphery of the cutting cylinder. It is common practice to refer to the roll 27 as the "cutting roll," but the term "presser roll" has been used herein in order to distinguish more obviously in the following description from the term "cutting cylinder." The sheet 28 of the calendered linoleum composition is fed so as to pass between the presser roll 27 and the cutting cylinder 23 and so that the cutting dies carried by the cutting cylinder will cut appropriate tesserae therefrom when the cutting dies presented by the cutting cylinder are in opposed relation to the surface of the presser roll.

The cutting cylinder carries cutting knives protruding from the periphery thereof which are disposed so as to cut desired tesserae from the calendered sheet as it passes between the cutting cylinder and the presser roll. In other words the knives arranged for cutting out any particular tessera constitute a cutting die, and the cutting dies are arranged so as to cut out the desired tesserae and so that they will be carried thereby in separated relation with respect to the unwanted portions of the calendered sheet.

Insofar as fixed cutting dies are concerned their construction is well known. For purposes of illustration a typical type of known cutting die arrangement has been shown in Fig. 8, the arrangement shown being that disclosed in Patent No. 1,784,487. As shown in Fig. 8 the periphery of the shell of the cutting cylinder 23 carries a plurality of blocks 29 which may be either square or of other polysided shape. Each of these blocks has a stem 30 adapted to be fitted within appropriate recesses in the shell of the cutting cylinder so that they may be held in place. The knives 31 are wedged between the sides of adjacent blocks so as to protrude from the periphery of the roll for cutting out the tesserae. In order that a tessera carried within the area defined by the knives 31 of a cutting die may be ejected therefrom, a plate 32 is provided which is secured to a spindle 33 that protrudes from the inner surface of the shell of the cutting cylinder. The plate 32 is held in the normally retracted position shown in Fig. 8 by the spring 34.

Figure 2:
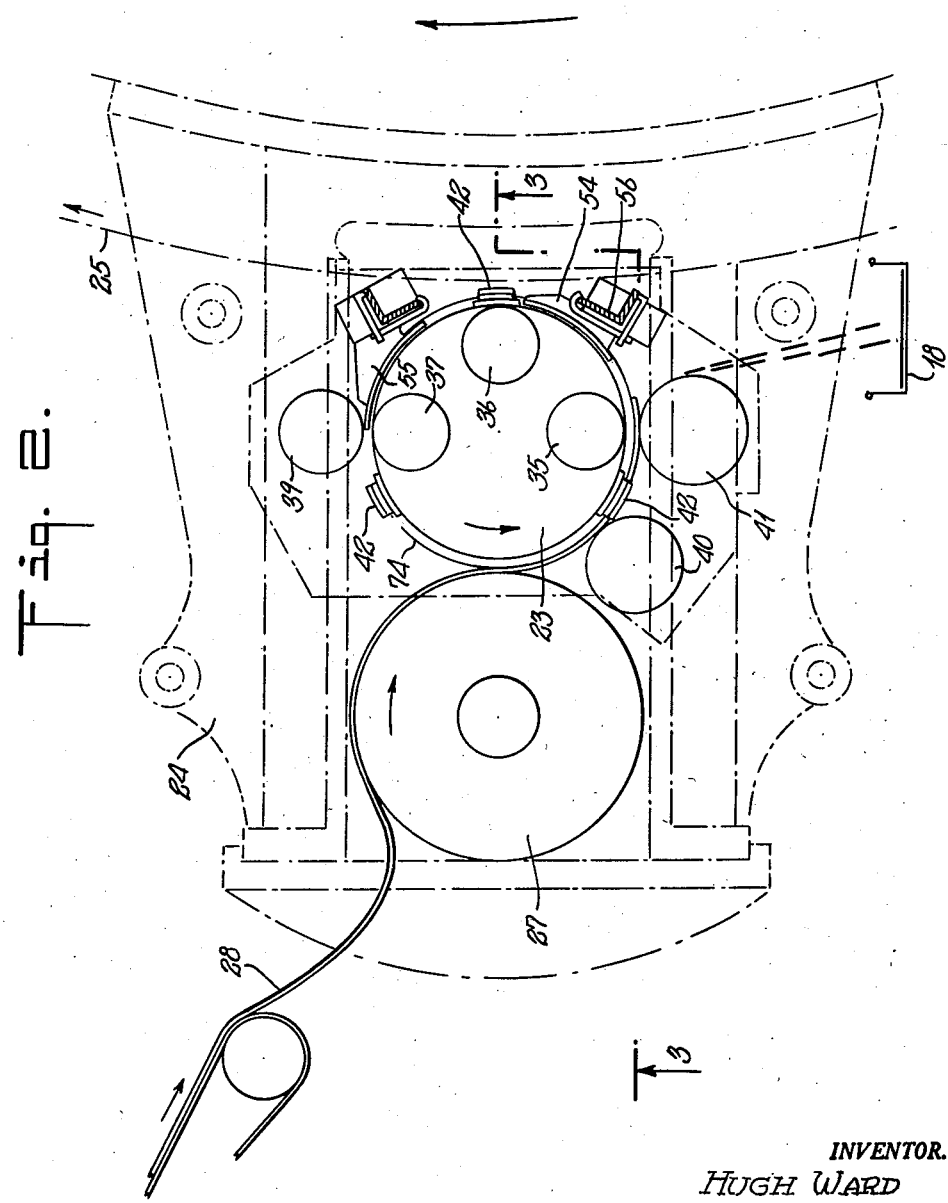
Fig. 2 is an end elevation shown largely schematically of one of the cutting cylinder assemblies which comprises movable cutting dies according to this invention and which is viewed looking toward the side of the apparatus as a whole which is shown in Fig. 1.

Within the shell of the cutting cylinder there is an internal rejecting roll 35, an internal inlaying roll 36 and an internal cleaning roll 37 (see particularly Fig. 2). In Fig. 8 it is the inlaying roll 36 which has been shown for purposes of illustration. When the parts are in the position shown in Fig. 8 the spindle 33 which is secured to the plate 32 is received in a recess 38 in the roll 36 and in such case when the periphery of the roll 36 approaches the inner surface of the shell of the cutting cylinder 23 the plate 32 is not moved. On the other hand if the spindle 33 comes opposite an unrecessed portion of the roll 36 the plate 32 is pushed outwardly to the position shown in dotted lines in Fig. 8 so as to eject a tessera from the cutting die. In the embodiment shown the roll 36 is arranged to make three complete revolutions during one complete revolution of the inlaying cylinder and the recessed and unrecessed portions of the surface of the roll 36 are so disposed that only the desired tesserae are ejected from the cutting dies therefor. In the case of the inlaying roll 36 these tesserae are those which are desired in the finished covering and when they are moved out of the cutting dies they are in position to be deposited on and transferred to the backing sheet which is carried on the surface 25 of the inlaying drum 11 as the backing sheet moves past the cutting cylinder.

The rejecting roll 35 is essentially similar to the inlaying roll 36 except that the recessed and unrecessed portions of the surface thereof are so disposed as not to reject the desired tesserae while the unwanted portions of the sheet are ejected so that they can be removed from the cutting cylinder before the desired tesserae reach the position where they are transferred to the backing sheet carried on the inlaying drum.

A cleaning roll 37 is generally provided and has an unrecessed surface whereby all the plates of all of the cutting dies are pushed outwardly so that they may be acted upon by the rotating cleaning brush 39 which serves to clean the surfaces of the plates.

In order to assist the recession of the tesserae into the spaces between the knives of the cutting dies a rotating brush 40 is provided which acts to depress the tesserae into the spaces between the knives. Another rotating brush 41 is provided which is opposite the rejecting roll 35 so as to assist the separation of the unwanted portions of the calendered sheet from the cutting cylinder at this point. As mentioned above the unwanted portions of the sheet fall into the scrap removal means 18.

The cutting cylinder 23 and the inlaying drum 11 are positively driven so as to have the same peripheral speed which is likewise approximately the peripheral speed of the presser roll 27, the presser roll 27 usually being driven so as to have a slightly higher peripheral speed. The driving mechanism has not been shown in detail inasmuch as such driving mechanism is conventional. The driving mechanism for rotating rolls 35, 36 and 37 and the brushes 39, 40 and 41 is also conventional and the details thereof have not been shown.

The mechanisms of the cutting cylinder assemblies as thus far described are conventional in apparatus of the type under present consideration and arrangements other than that shown may be employed for effecting the desired actions.

In conventional cutting cylinders the nature of the surface, including the cutting dies and knives and other parts associated therewith, has been of the character above described and such surface has extended from one end of the cutting cylinder to the other throughout the entire width of the finished covering material. This has been the case whether the cutting cylinder handles the sheet of background material or the sheets of other colors which make up the various pattern elements in the finished product.

According to this invention a cutting cylinder is provided which is characterized by the provision of means whereby one or more of the cutting dies, as may be desired, may be moved lengthwise of the cutting cylinder. Moreover, means is provided whereby such lengthwise movement is caused to occur during the rotation of the cutting cylinder. A specific embodiment of such means is shown particularly in Figs. 2 to 7.

Figure 3:
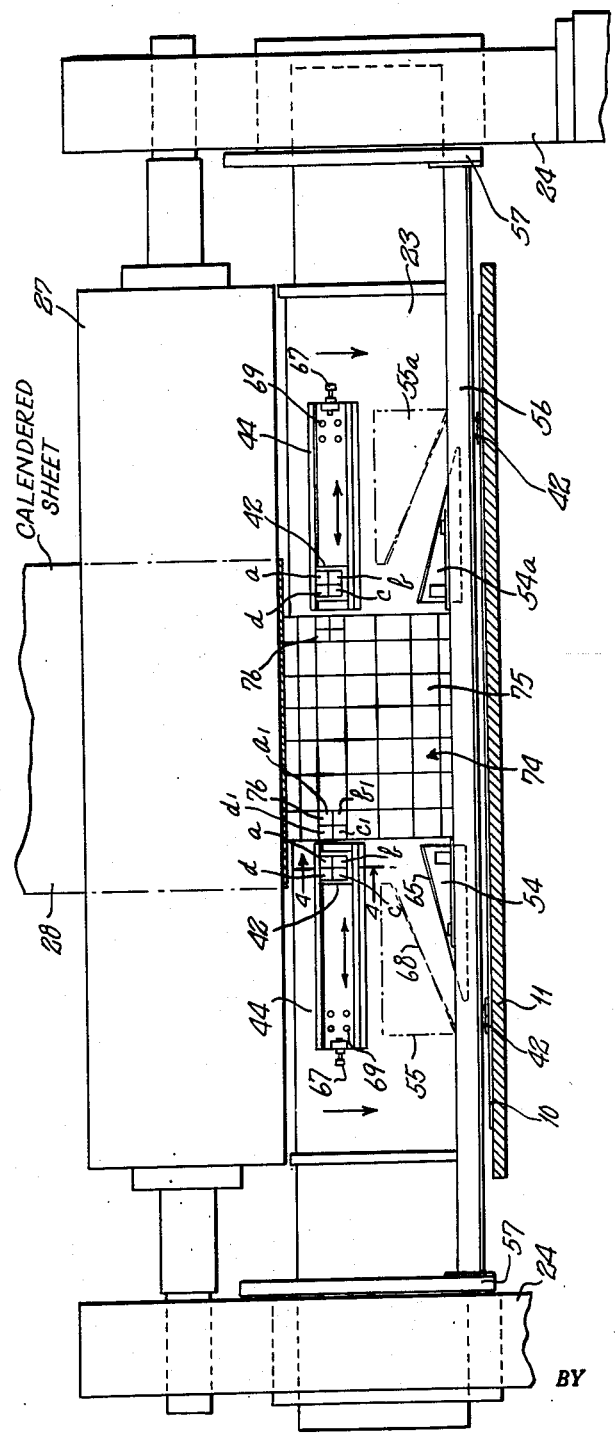
Fig. 3 is a view of the cutting cylinder assembly of Fig. 2 taken from the line 3—3 of Fig. 2 and showing the movable cutting die and cam arrangement, the balance of the showing being largely schematic.
Figure 4:
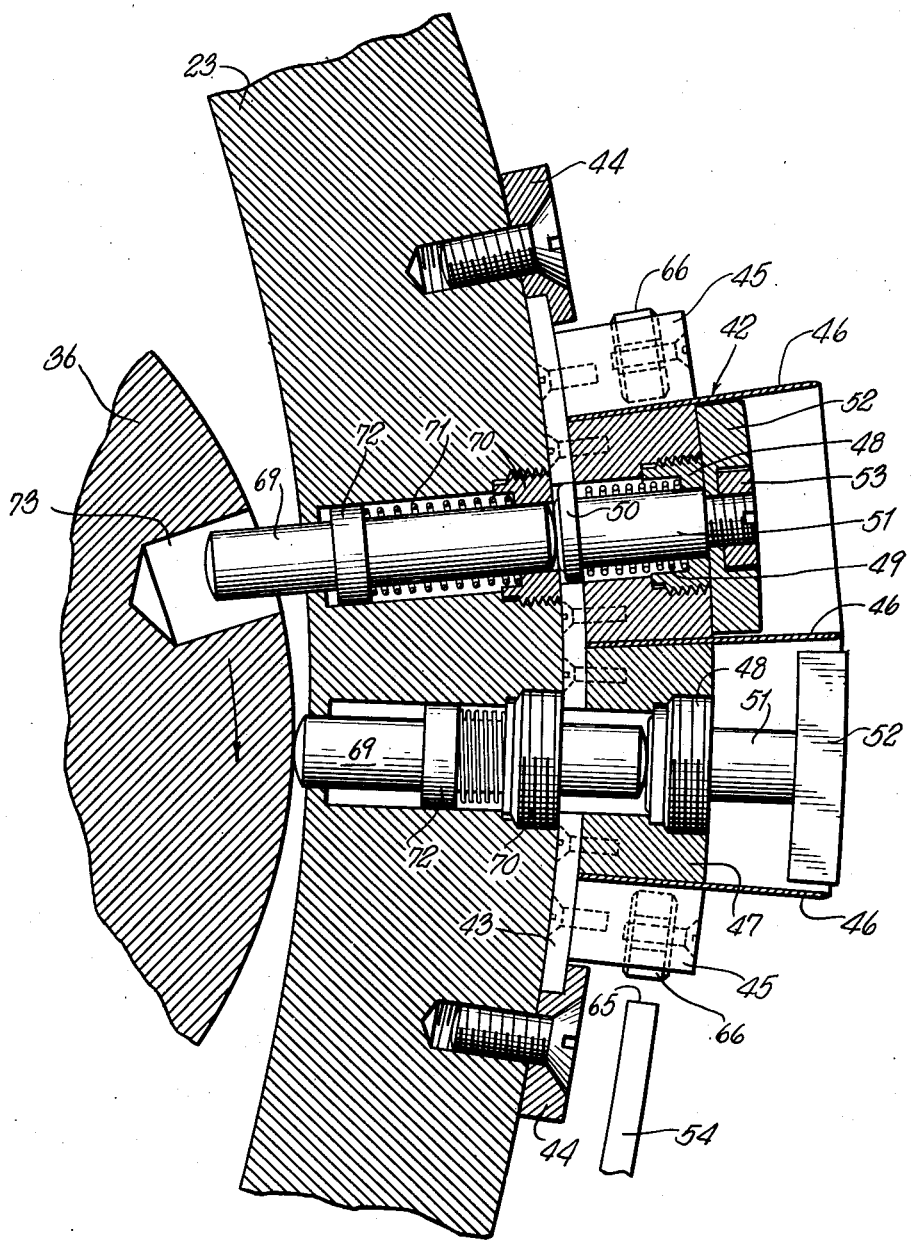
Fig. 4 is a detail sectional view on an enlarged scale and taken in the line 4—4 of Fig. 3 which shows a movable cutting die as carried by the cutting cylinder and the means for ejecting tesserae carried thereby when the die is in the inlaying position.

In Fig. 3 two of the movable cutting dies, which are indicated by the reference character 42, are shown facing the observer in the cutting position and two other of these dies are shown opposite the inlaying drum in the inlaying position. The detailed construction of one of these dies and how it is carried on the cutting cylinder is shown in Fig. 4. Each cutting die is divided into four sections which have been indicated as a, b, c and d in Figs. 3 and 7. While the cutting die is thus illustrated as comprising four sections it may alternatively consist of only one section or any other number of sections as may be desired; and while four sections have been shown for purposes of illustration the unit as a whole will be referred to as a cutting die. The cutting die unit is composed of a plate 43 which is curved to conform to the periphery of the shell of the cutting cylinder 23 and which is slidably mounted relative to the shell of the cutting cylinder for movement lengthwise thereof by the marginally undercut rails 44. Secured to the plate 43 are the retaining blocks 45 which extend along the outer surface of each of the cutting knives 46, the knives 46 being frictionally held between the retaining blocks 45 and the inner blocks 47 which correspond to the sections a, b, c and d of the cutting die. Each of the blocks 47 is provided with a core that is threaded at the outer end to receive the annular spring retaining bushing member 48 which retains the compression spring 49 so as to exert resilient pressure against the headed end 50 of the stem 51 which has the plate 52 secured to the opposite end thereof by the nut 53 as shown. In this manner the plate 52 is normally maintained in retracted position and in such case it is to be noted that the headed end 50 clears the peripheral surface of the shell of the cutting cylinder 23 or as to permit the sliding of the cutting die lengthwise of the cutting cylinder as carried by the tracks 44.

Figure 5:
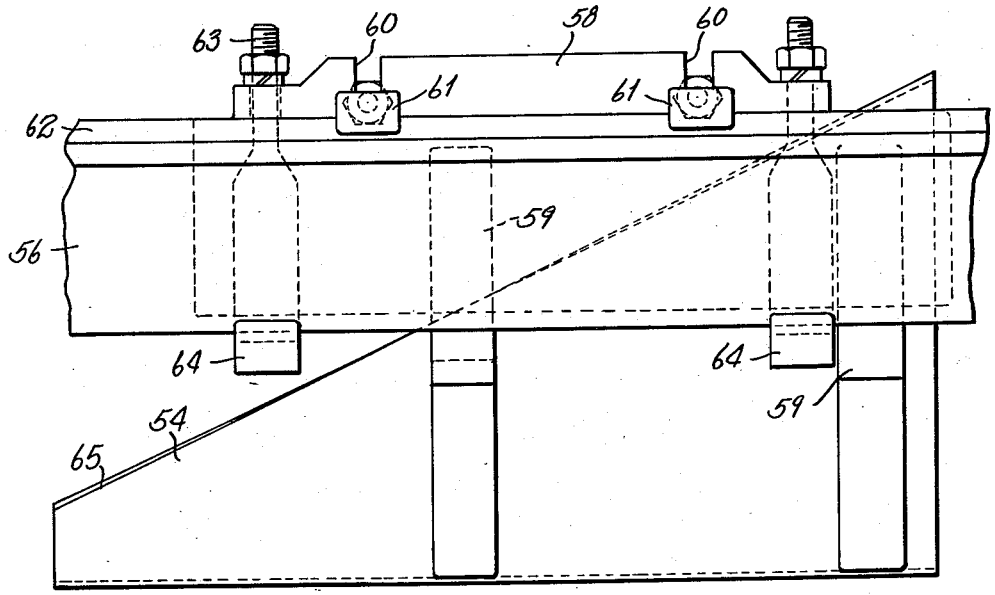
Fig. 5 shows one of the cams for moving one of the movable cutting dies and the mounting means therefor when viewed from the back of the cam, namely, looking toward the approaching cutting cylinder.
Figure 6:
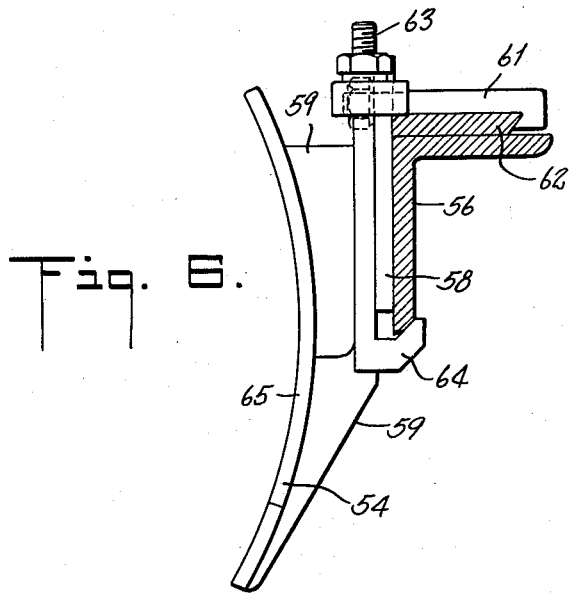
Fig. 6 is an end view of the cam shown in Fig. 5 as viewed from the left.

The means for moving each of the movable cutting dies lengthwise of the cutting cylinder is shown particularly in Figs. 3, 5, 6, and 7. In the embodiment shown the movable cutting dies are moved back and forth lengthwise of the cutting cylinder, as guided by the tracks 44, by means of stationary cams carried adjacent the periphery of the cutting cylinder. The cam mechanism may be illustrated by reference to the cam means for moving the cutting die 42 that is adjacent the left hand end of the cutting cylinder 23 as shown in Fig. 3. This cutting die is moved to the left by the cam 54 and is moved to the right by the cam 55 which, as is evident from the dotted line indication in Fig. 3, is in back of the cutting cylinder. The cam 54, as shown in Figs. 2, 3, 5 and 6, is carried by an angle bar 56 which extends between and is attached to the bearing housing members 57 that are carried respectively by the frames 24, and preferably the cam 54 is secured to the angle bar 56 in detachable and adjustable relation. In the embodiment shown the cam 54 is carried from the plate 58 by the integral web members 59. The plate 58 has the notches 60 in the upper margin thereof (as shown in Fig. 5) so that it can be adjustably moved up and down in relation to the special clamping bolts 61 which are adapted, when tightened, to hold the plate 58 firmly clamped against the angle bar 56 by the co-action of the ends of the bolt 61 with the undercut edge of the plate 62 which is secured to the angle bar 56. The clamping bolts 63 are also employed which are provided with the clinching end portions 64 so that when these bolts are tightened down they also serve to hold the plate 58 firmly in place. When the bolts 61 and 63 are loosened the cam 54 can be adjusted as desired both lengthwise of the angle bar 56 and to a certain extent transversely thereto, thereby permitting accurate location of the cam 54, and when the bolts are tightened down the cam 54 is maintained firmly in the desired location. The proximity of the cam 54 to the cutting cylinder can be adjusted, if desired, by the interposition of shims (not shown) between the plate 58 and the angle bar 56. The movable cutting die 42 is provided with the rollers 66 which are rotatably carried in the blocks 45. The cam surface 65 of the cam 54, as well as the cam surface of each of the other cams, is so positioned as to permit rolling contact between the cam surface and at least one of the rollers 66.

In Fig. 3 the surface of the cutting cylinder facing the observer is rotating in the direction of the arrow. Therefore, it is apparent that when the left hand cutting die 42 that faces the observer as shown in Fig. 3 reaches the cam surface 65 of the cam 54 further rotation of the cutting cylinder in the same direction causes the cutting die 42 to move to the left until the end of the cam surface 65 is reached and, in order that the extent of the travel of the cutting die 42 in this direction may be accurately limited, an adjustable stop 67 is provided at the left hand end of the tracks 44.

With further reference to Fig. 3 the cam 55 is similar in all respects to the cam 54 except that the cam surface 68 thereof is so positioned as to receive the die as moved to the left by the cam 54 and is inclined in the opposite direction so that further rotation of the cutting cylinder will cause the left hand cutting die 42 shown in Fig. 3 to be moved to the right and back to the position shown in Fig. 3. At the right hand side of Fig. 3 the cams 54a and 55a are in all respects similar to the cams 54 and 55 and are similarly carried except that the cam surfaces thereof are complementarily arranged so that when the right hand cutting die 42 strikes the cam 54 it will be moved to the right and when further rotation of the cutting cylinder 23 causes it to contact the cam 55a it will be moved to the left and back to its original position as shown in Fig. 3. More generally, in Fig. 3 cutting dies 42 are shown which are slidable lengthwise of the roll together with means for alternately moving these dies outwardly toward the end of the cutting cylinder and then back to their original positions more adjacent the center of the cylinder during different portions of the rotational movement of the cutting cylinder.

In addition to the cutting dies 42 other movable cutting dies may be similarly carried for contact with the cams, and in Fig. 2 such movable dies are shown which are angularly spaced from each other by 120°. However, the number of such dies and their location will in any case depend upon the particular pattern which is to be produced.

With further reference to Fig. 3 the cutting dies 42 are in cutting position when they are adjacent the inner portion of the cutting cylinder and are in inlaying position for transfer of one or more tesserae carried thereby to the backing sheet when they have been moved to the positions more adjacent the ends of the cutting cylinder as determined by the stops 67. When the cutting dies 42 are in the latter position, namely, the inlaying position it is necessary that the desired tesserae carried thereby be ejected therefrom for transfer to the backing sheet carried by the inlaying drum.

Hereinabove the ejecting means carried by each of the cutting dies 42 has been described and it has been pointed out that this ejecting means is of such character as to permit the sliding of each of the cutting dies 42 as a unit in the tracks 44 and lengthwise of the cutting cylinder. In order to actuate this ejecting means the shell of the cutting cylinder 23 is apertured to receive the plunger pins 69. For reciprocatably carrying each of these pins 69 there is provided in the outer periphery of the shell an annular bushing member 70 and the compression spring 71 is disposed between the annular bushing 70 and the shoulder 72 that is integral of the plunger pin so as to maintain the plunger pin 69 in normally retracted position. This structure is shown in detail in Fig. 4, and for purposes of illustration the pins 69 are shown as being acted upon by the internal inlaying roll 36 shown in Fig. 2. The plunger pins 69 are in registration with the stems 51 on which the ejecting plates 52 of the cutting die are carried when the die 42 has been moved outwardly so as to come in contact with the stop 67. Fig. 4 shows one of the plunger pins 69 being acted upon by the inlaying roll 36 so as to push out one of the plates 52, while the other plunger pin 69 has been shown in registration with the recess 73 in the inlaying roll 36 with the result that the other plate 52 remains in its normal position. In the case of the tessera carried by the plate 52 that has been pushed outwardly the tessera will be brought to position for transfer to the backing sheet carried by the inlaying drum. When, as shown in Fig. 4, the other plate 52 is not actuated while the cutting die 42 is in the inlaying position, it would normally be the case that this plate would have been actuated by the rejecting roll 35 so as to eject a tessera therefrom so that such tessera would be removed with the other unwanted material by the action of the rejecting roll. For this purpose corresponding plunger pins 69a (see Fig. 7) may be provided in the shell of the cutting cylinder 23 so as to register with the stems 51 when the cutting die 42 is in the cutting position shown in Fig. 3. Whether one or the other or both of the ejecting plates are moved when the cutting die 42 is either in the rejecting position or in the inlaying position will depend upon the particular pattern which is to be produced.

In the embodiment shown the portion of the surface of the cutting cylinder which carries the calendered sheet of linoleum composition or the like occupies only a minor proportion of the longitudinal extent of the cutting cylinder. This portion of the cutting cylinder is generally indicated by the reference character 74 in Fig. 3. This surface is normally composed of a plurality of fixed cutting dies 75, the outer surfaces of which lie flush with the outer surfaces of the movable cutting dies 42. Hereinabove, and particularly with reference to Fig. 8, a typical cutting die construction for this portion of the cutting cylinder has been described. Two of these cutting dies which are indicated by the reference character 76 in Figs. 3 and 7 have been shown subdivided into four portions, namely, a1, b1, c1 and d1, which correspond to the portions a, b, c, and d respectively of the movable cutting dies 42. Each of these portions may be of the general character illustrated in Fig. 8 and in the embodiment illustrated are adapted to carry the desired tesserae which are to appear in the finished product. The other cutting dies 75 are adapted to carry the unwanted material which is rejected.

In Fig. 3 the backing sheet 10 is shown as carried by the inlaying drum 11 and it is to be noted that its width corresponds to the length of the cutting cylinder 23. The calendered sheet 28 is also shown in Fig. 3 and it is to be noted that its width is only a small proportion of the length of the cutting cylinder and is such as to overlie the surface 74 while extending on each side thereof so as to overlie the movable dies 42 when they are in the inner or cutting position.

The sequence of the operations performed is illustrated by the development shown in Fig. 7. The relative widths and positions of the backing sheet 10 carried by the inlaying drum and of the calendered sheet of linoleum composition or the like passed over the cutting cylinder 23 are shown in this figure. Starting at the top of Fig. 7 the movable dies 42 and the fixed dies 76 are shown in the position which they occupy when these dies are in the cutting position and when they have been brought opposite the presser roll 27 so as to press the knives of the cutting dies into the sheet material 28. In this position both the movable dies 42 and the fixed dies 76 will cut desired tesserae from the sheet 28 while these dies are in relatively closely adjacent relation. These desired tesserae, as well as the unwanted material contained in the sheet 28, are carried by the cutting cylinder to the rejecting position and during this portion of the rotational movement of the cutting cylinder the position of the movable dies 42 remains the same. When in the rejecting position the unwanted portions of the sheet 28 are separated from the cutting cylinder in the customary way for discard as scrap.

When the cutting cylinder is rotated beyond the rejecting position the movable dies 42 come in contact with the cams 54 and 54a so as to be moved outwardly to the desired inlaying position so that they reach the inlaying position prior to coming opposite the backing sheet carried by the inlaying drum. When they come opposite the backing sheet carried by the inlaying drum the desired tesserae to be transferred to the backing sheet are ejected from the movable cutting dies 42 and from the fixed cutting dies 76 and are deposited on the backing sheet. During further rotation of the cutting cylinder in the same direction the dies 42 come into contact with the cams 55 and 55a which return the movable dies to the inner or cutting position. In this position the plates associated therewith as well as the plates of the fixed dies are all thrust forward so that they can be cleaned by the cleaning brush 39. Further rotation of the cutting cylinder brings the movable and fixed cutting dies back to their original cutting position opposite the presser roll.

The result of the foregoing operation is the deposition on the backing sheet of the desired tesserae distributed over the entire width of the backing sheet in uniformly spaced location as shown in Fig. 7 even though they were originally cut from a much narrower sheet of composition material.

While one typical operation has been illustrated above it is apparent that the principle employed according to this invention may be utilized in other ways. For example, the movable cutting dies 42 may remain in the inlaying position as carried to the cleaning position and then returned to the cutting position upon further rotational movement of the cutting cylinder so as to bring them to the cutting position opposite the presser roll. In such case the cams 55 and 55a would be located between the cleaning position and cutting position as shown in the development according to Fig. 7. If no tesserae are ejected from the movable dies while these dies are in the inner or cutting position, the pins 69a may be omitted from the shell of the cutting cylinder. Moreover, while the arrangement shown comprises two fixed cutting dies for cutting tesserae desired in the finished pattern in proximate relation to two movable cutting dies, other arrangements may be employed depending upon the nature of the pattern. For example, only a single fixed cutting die may be employed with a movable die on each side thereof. In such case the width of the sheet 28 could be made considerably narrower than the width indicated in Figs. 3 and 7. It is also the case that the fixed cutting dies which carry the desired tesserae need not necessarily be disposed so as to be immediately opposite the movable cutting dies, but may be arranged in staggered relation thereto so that the desired tesserae would be deposited in a staggered geometrical arrangement instead of falling along successive lines extending transversely across the base sheet as shown in Fig. 7.

In connection with the foregoing description of the operation of one cutting cylinder comprising movable dies according to this invention it is apparent that such a cutting cylinder would normally be employed in an apparatus which as a whole also comprises a cutting cylinder adapted to deposit background material on the backing sheet. Thus in Fig. 1 the calendered sheet material for the background would be fed to the background cylinder assembly 17 which could be of the conventional type previously used, that is, a cutting cylinder which does not employ as movable dies and which is adapted for depositing the background material on the backing sheet except in the locations where the pattern elements or tesserae are to be inlaid therein. A special cutting cylinder of the type embodying this invention would then be employed in connection with the cutting cylinder assembly 16 shown in Fig. 1 for inlaying in the background the tesserae of the pattern elements as above described and employing a sheet of calendered linoleum composition or the like which is much narrower than the width of the backing sheet or the width of the sheet of background composition material.

A typical operation has been described hereinabove wherein the portions a, b, c and d of the movable dies and the portions a1, b1, c1 and d1 of the fixed dies operate simultaneously in cutting tesserae from the sheet 28 and in depositing them on the backing sheet when the movable dies 42 are in the inlaying position. In such case only one cutting cylinder embodying this invention is required, e. g., that of the cutting cylinder assembly 16, in addition to the background cylinder. However, when more than one color other than the color of the background sheet is desired, more than one cutting cylinder mechanism embodying this invention may be employed. For example, the cutting cylinder assembly 16 of Fig. 1 which embodies the movable cutting dies 42 may be constructed in relation to the ejecter roll 35 and in relation to the inlaying roll 36 so that tesserae carried only by the portions a and c of the movable dies 42 and a1 and c1 respectively of the fixed dies 76 will carry these tesserae to the inlaying position, the other two tesserae being rejected by the rejecting roll. In such case the cutting cylinder assembly 16a may be provided which handles a sheet of another contrasting color and which is similar to the cutting cylinder 16 assembly except that it is arranged so as to inlay on the backing sheet the tesserae carried only by the portions b and d of the movable cutting dies 42 and only by the portions b1 and d1 of the fixed cutting dies 76. Similarly, if the pattern is to comprise still another color, the cutting cylinder assembly 16b, which also utilizes my invention, may be employed, each assembly being arranged so as to cut tesserae from the respectively different colored sheets and to reject all but one color, and the color deposited on the backing sheet by each assembly being different from that deposited by any of the others.

It is apparent from the foregoing that by the use of movable cutting dies which are movable lengthwise of a cutting cylinder according to this invention it is possible in a continuous operation to manufacture coverings such as inlaid linoleum and the like wherein pattern elements of a desired color are distributed over the entire width of the backing sheet carried by the machine even though the calendered sheet material of the desired color which is fed to the cutting cylinder is much narrower than the width of the backing sheet. This invention, therefore, provides novel means whereby very great savings in the amount of scrap produced can be realized. In addition it is apparent that the expensive construction of the portion of the cutting cylinder which carries the calendered sheet material can be reduced so as to occupy only a relatively small proportion of the over-all length of the cutting cylinder in relation to the width of the backing sheet. In this manner the cost of the cutting cylinder of this invention as compared with conventional cutting cylinders can be very greatly reduced, the cost of mounting the movable cutting dies on the cutting cylinder being much less than if the conventional peripheral surface of a cutting cylinder were employed in the regions of the cutting cylinder occupied by the movable cutting dies. Moreover, since the number of parts of the cutting cylinder can be greatly reduced according to this invention there is not only a reduction in initial manufacturing cost, but also a very substantial reduction in maintenance cost.

I claim:

1. In apparatus of the character described, the combination with a cutting cylinder adapted for cutting and inlaying tesserae of means for rotatably mounting said cylinder, a cutting die peripherally carried by said cutting cylinder and adapted for cutting a tessera, means for mounting said cutting die on said cutting cylinder for movement along the periphery of said cylinder between two positions spaced apart lengthwise of the cylinder, and means for moving said cutting die back and forth between said positions during the rotation of said cylinder.

2. In apparatus of the character described, the combination with a cutting cylinder adapted for cutting and inlaying tesserae of means for rotatably mounting said cylinder, a cutting die peripherally carried by said cutting cylinder and adapted for cutting a tessera, means for slidably mounting said cutting die for movement between a cutting position and an inlaying position spaced lengthwise of the cylinder from said cutting position, means for moving said cutting die from said cutting position to said inlaying position during one portion of the revolution of the cutting cylinder, means for moving said die from said inlaying position to said cutting position during a subsequent portion of the revolution of said cylinder, and means for ejecting a tessera from said cutting die when said cutting die is in said inlaying position.

3. In apparatus of the character described the combination with a cutting cylinder adapted for cutting and inlaying tesserae of means for rotatably mounting said cylinder, a first cutting die peripherally carried by said cutting cylinder, a second cutting die peripherally carried by said cutting cylinder in slidable relation thereto lengthwise of the cylinder between a first position adjacent said first cutting die and a second position more remote from said first cutting die, means for moving said second cutting die from said first position to said second position during a portion of a revolution of said cutting cylinder, means for moving said second cutting die from said second position to said first position during a second portion of the revolution of said cutting cylinder, means for ejecting a tessera from said second cutting die when it is in said second position and is at a predetermined location disposed in a given radial direction from the cylinder axis, and means for ejecting a tessera from said first cutting die when said first cutting die is at a predetermined location disposed in substantially the same radial direction from the cylinder axis.

4. In apparatus of the character described, a cutting cylinder having a circumferential peripheral surface centrally located between the ends of the cylinder and adapted to carry a sheet of composition material thereon, a movable cutting die substantially flush with said surface and slidably mounted for movement between a first position adjacent said peripheral surface and a second position substantially more remote therefrom lengthwise of the cylinder, means for moving said cutting die from said first position to said second position and from said second position back to said first position during one complete revolution of the cylinder, a fixed cutting die within and adjacent the margin of said surface, means cooperating with said movable cutting die when in said first position and with said fixed cutting die for causing each of said dies respectively to cut a tessera from a sheet of composition material fed onto said surface, and means for substantially simultaneously ejecting said respective tesserae from said movable cutting die when in said second position and from said fixed cutting die.

5. Apparatus of the character described comprising a rotatably mounted cutting cylinder, means for feeding a sheet of composition material to said cutting cylinder, a movable cutting die peripherally carried by said cutting cylinder and mounted for movement between a first position and a second position spaced apart lengthwise of the cutting cylinder from said first position, means for pressing said sheet of composition material against said cutting die when in said first position to cut a tessera therefrom and when said cylinder is in a first rotational position, means for ejecting said tessera from said cutting die when in said second position and when said cylinder is in a second rotational position, first stationary cam means adjacent the periphery of said cutting cylinder cooperating with said cutting die and adapted to move said cutting die from said first position to said second position during rotation of said cutting cylinder between said first and second rotational positions, and second stationary cam means adjacent the periphery of said cutting cylinder cooperating with said cutting die and adapted to move said cutting die from said second position to said first position during continued rotation of said cylinder in the same direction from said second to said first rotational position.

6. Apparatus according to claim 5 which comprises means for rejecting unwanted portions of said sheet of composition material during rotation of said cutting roll from said first rotational position and prior to movement of said cutting die from said first position.

7. Apparatus according to claim 5 which comprises a fixed cutting die carried by said cutting cylinder more adjacent the mid portion of said cutting cylinder in relation to said first and second positions of said movable cutting die, means for pressing said sheet of composition material against said fixed cutting die to cut a tessera therefrom while said fixed cutting die is disposed at substantially the same radial direction from the cylinder axis as that of said movable cutting die when said cylinder is in said first rotational position and means for ejecting the tessera from said fixed cutting die while said fixed cutting die is disposed substantially at the same radial direction from the cylinder axis as that of said movable cutting die when said cylinder is in said second rotational position.

8. In a cutting cylinder of the character described, a cutting die comprising projecting knives adapted to cut a tessera from a sheet of composition material, means for slidably mounting said cutting die for movement lengthwise of said cylinder between a first predetermined position and a second predetermined position, an ejecting plate within the knives of said die, a stem carrying said plate and reciprocably mounted in said die for movement of said plate relative to said knives between outwardly thrust and retracted positions, means for maintaining said stem and said plate carried thereby in normally retracted position, the inner end of said stem being exposed at the back of said die and clearing the shell of said cylinder when said stem and said plate carried thereby are in retracted position, a plunger pin passing through the shell of said cylinder and reciprocatably mounted therein between thrust forward and retracted positions, means for normally maintaining said pin in retracted position, said pin when in retracted position projecting substantially from the inner surface of said cylinder shell and not protruding substantially from the outer surface of said cylinder shell, and said pin and said stem being in substantial alignment when said cutting die is in one of said predetermined positions so that outward movement imparted to said pin is transmittable to said stem and said plate carried thereby for ejecting a tessera from said cutting die.

9. In apparatus of the character described the combination comprising at least two tesserae cutting means adapted to cut from a sheet of composition material and retain therein at least two independent tesserae when said tesserae cutting means are disposed at a first given spacing from each other, means for increasing the lateral spacing of said tesserae cutting means to a second given spacing, means for ejecting the cut tesserae from said tesserae cutting means when said tesserae cutting means are disposed at said second given spacing, and means for returning the tesserae cutting means to said first given spacing.

HUGH WARD.

References Cited in the file of this patent

UNITED STATES PATENTS

| Number | Name | Date |
|---|---|---|
| 1,784,487 | Feeney | Dec. 9, 1930 |
| 1,838,307 | Hallock | Dec. 29, 1931 |
| 2,033,736 | Perryman | Mar. 10, 1936 |
| 2,112,419 | Krause | Mar. 29, 1938 |
| 2,393,745 | Brunner | Jan. 25, 1946 |
| 2,519,159 | Talbot | Aug. 15, 1950 |